(12) United States Patent
Gilbert et al.

(10) Patent No.: US 9,126,629 B2
(45) Date of Patent: Sep. 8, 2015

(54) MOTOR VEHICLE SUPPORT STRUCTURE

(71) Applicant: Dr. Ing. h.c. F. Porsche Aktiengesellschaft, Stuttgart (DE)

(72) Inventors: Tassilo Gilbert, Pforzheim (DE);
Philipp Kellner, Stuttgart (DE);
Michael Junginger, Boeblingen (DE);
Frank Kunert, Bardowick (DE);
Sebastian Steinruecken, Olsberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/185,155

(22) Filed: Feb. 20, 2014

(65) Prior Publication Data
US 2014/0232095 A1    Aug. 21, 2014

(30) Foreign Application Priority Data

Feb. 20, 2013   (DE) .......................... 10 2013 101 698

(51) Int. Cl.
*B62D 7/22*   (2006.01)
*B62D 21/00*  (2006.01)

(52) U.S. Cl.
CPC ..................... *B62D 21/00* (2013.01)

(58) Field of Classification Search
USPC ............... 280/781, 784; 296/203.2, 203.3, 296/187.09, 187.12, 193.06, 203.01, 296/203.02, 198, 209
See application file for complete search history.

(56) References Cited

U.S. PATENT DOCUMENTS

| | | | |
|---|---|---|---|
| 3,881,742 A | 5/1975 | Felzer | |
| 4,909,565 A * | 3/1990 | Harasaki et al. | 296/187.09 |
| 5,011,201 A * | 4/1991 | Takahashi et al. | 296/203.02 |
| 5,275,436 A | 1/1994 | Pomero | |
| 5,348,113 A | 9/1994 | Drvota | |
| 6,286,867 B1 * | 9/2001 | Braemig et al. | 280/784 |
| 6,511,119 B2 | 1/2003 | Takase et al. | |
| 6,631,942 B1 | 10/2003 | Kitagawa | |
| 6,866,115 B2 * | 3/2005 | Miyasaka | 180/311 |
| 6,938,950 B2 * | 9/2005 | Nagafuchi et al. | 296/203.02 |
| 8,469,442 B1 * | 6/2013 | Pencak et al. | 296/187.12 |
| 8,814,248 B2 * | 8/2014 | Mildner | 296/75 |

FOREIGN PATENT DOCUMENTS

| | | |
|---|---|---|
| DE | 19835705 | 2/2000 |
| DE | 198 38 955 | 3/2000 |
| DE | 102005050959 | 7/2007 |
| DE | 102011085673 | 5/2012 |
| EP | 1 044 863 | 4/2000 |
| EP | 1 278 674 | 1/2002 |
| EP | 1 270 375 A1 | 2/2003 |
| JP | H11-342869 | 12/1999 |
| WO | 2013/121890 | 8/2013 |

OTHER PUBLICATIONS

British Patent Application No. GB 1402670.2-Combined Search and Examination Report issued on Sep. 2, 2014.

* cited by examiner

*Primary Examiner* — Toan To
(74) *Attorney, Agent, or Firm* — Gerald E. Hespos; Michael J. Porco; Matthew T. Hespos

(57) ABSTRACT

A motor vehicle structure has an A pillar (5), a sill, a front wheel (8) and a slide-off surface (50) for the front wheel (8). The A pillar (8), as viewed in cross section, exhibits a higher strength in an inner region (49) than in an outer region (48) in order to realize the slide-off surface (50).

11 Claims, 2 Drawing Sheets

MOTOR VEHICLE SUPPORT STRUCTURE

CROSS REFERENCE TO RELATED APPLICATION

This application claims priority under 35 USC 119 to German Patent Appl. No. 10 2013 101 698.7 filed on Feb. 20, 2013, the entire disclosure of which is incorporated herein by reference.

BACKGROUND

1. Field of the Invention

The invention relates to a motor vehicle support structure having an A pillar, a sill, a front wheel and a slide-off surface for the front wheel.

2. Description of the Related Art

EP 1 278 674 B1 discloses a front-end arrangement for a motor vehicle that has a front wheel, a motor vehicle body component and a front wheel transverse guide. The front wheel transverse guide is arranged on a front end of a door sill and has a guide part for displacing the front wheel inward in the width direction of the motor vehicle in the event of a front-on collision of the motor vehicle. EP 1 044 863 A1 discloses a motor vehicle having a support structure with a crumple zone at one end of a passenger safety cell and two wheel arches arranged on the sides in the region of the crumple zone. Wheels are held by wheel control elements in the respective wheel arches. A deflection surface is defined between the passenger safety cell and the rolling circumference of the respective wheels in the straight-ahead position. Each deflection surface is oblique to the longitudinal central axis of the motor vehicle. Thus, a wheel that is moved onto the deflection surface as a result of crash-induced deformation of the crumple zone will be deflected past the face side of the passenger safety cell. The deflection surfaces also are oriented obliquely down to define deflection ramps that guide the wheels down under the floor of the vehicle during the collapse of the crumple zone in the direction of the passenger safety cell. DE 198 38 955 A1 discloses a vehicle body having a deformation element arranged between an A pillar and the wheels of the vehicle.

It is an object of the invention to provide a motor vehicle support structure having an A pillar, a front wheel and a slide-off surface for the front wheel. The motor vehicle support structure should be of simple construction and inexpensive to produce while at the same time being of low weight.

SUMMARY OF THE INVENTION

The invention relates to a motor vehicle support structure having an A pillar, a sill, a front wheel and a slide-off surface for the front wheel. The A pillar, as viewed in cross section, exhibits higher strength in an inner region than in an outer region to realize the slide-off surface. The slide-off surface can be realized in a simple manner without additional components by means of the different strengths in the inner and outer regions of the A pillar cross section. In this way, the slide-off surface can be realized in a particularly advantageous manner without cross-sectional losses of the A pillar. The A pillar cross section changes only under load. The different strengths of the A pillar cross section advantageously are coordinated with one another so that, in the event of a front-on crash, the front wheel slides out along the slide-off surface. In this case, the slide-off surface may be formed entirely or partially on the A pillar. The slide-off surface of the invention reduces the probability of the front wheel becoming wedged with the A pillar in a specific crash situation in which the motor vehicle impacts, with twenty-five percent overlap, against a rounded barrier. This advantageously prevents a major part of the forces that act on the front wheel from being transmitted to a passenger cell of the motor vehicle. The sliding-off motion of the front wheel along the A pillar advantageously enables the passenger compartment to be smaller. In this way, with as low a weight of the motor vehicle as possible, high demands with regard to crash safety can be met even in the specific crash load situation.

The A pillar may have a greater wall thickness in the inner region than in the outer region to achieve the slide-off surface. The wall thicknesses of the A pillar advantageously are selected so that all of the loads that occur during the operation of a motor vehicle can be withstood with adequate safety.

The inner region of the A pillar may be formed from a material of higher strength than a material in the outer region. For example, the inner region of the A pillar may be formed from a hot-formed steel, such as steel with the short designation 22MnB5.

The outer region of the A pillar may be formed from a material with a greater elongation at fracture than a material in the inner region.

An inner region of the A pillar may be formed from a material with a strength considerably greater than 1200 MPa. This value has proven to be particularly advantageous within the context of the present invention. The slide-off surface according to the invention particularly advantageously arises from a rigid connection of the A pillar to the front bulkhead or to the transverse bulkhead member thereof.

An outer region of the A pillar may be formed from a material with a strength considerably less than 1200 MPa. This value has proven to be particularly advantageous within the context of the present invention.

A front inner sub-region of the A pillar may have locally modified material characteristics. For this purpose, the A pillar, as viewed in cross section, advantageously is treated in the front inner sub-region by a tailored tempering process. Tailored tempering for hot-formed components is particularly advantageous for obtaining locally lower strengths to realize possibilities for using cold joining processes. Alternatively, use may be made of tailor-welded blank technology. It is also possible for a micro-alloyed steel to be used for the soft region and for a hardened steel to be used for the hard region.

A further embodiment of the motor vehicle structure may have a slide-off surface in a sill region at a front end. The slide-off surface may have a lower load path, by means of a form-imparting structure to assist a sliding-off motion.

A front A pillar flange region may be arranged toward the center of the vehicle. The A pillar advantageously may be formed from two profile elements. The two profile elements may be connected fixedly to one another by two front flanges and two rear flanges in the front A pillar flange region and in the rear A pillar flange region. The A pillar flange regions may be arranged centrally as viewed in the vehicle transverse direction and with respect to the A pillar. However, the front A pillar flange may be inward toward the center of the vehicle for considerably improving the sliding-off motion of the front wheel along the A pillar.

A front bulkhead may be fastened at the inside to the front A pillar flange region for simplifying outlay in terms of assembly. Furthermore, the front bulkhead advantageously can be used together with the A pillar to form the slide-off surface.

The front bulkhead may be combined with a cross member. The cross member preferably is behind the bulkhead as viewed in the vehicle longitudinal direction. Thus, the front bulkhead may be between the front wheel and the cross member.

The bulkhead cross member and the inner A pillar may be made of high-strength steel and are connected fixedly to one another to prevent intrusion into the passenger cell when the wheel impacts against the A pillar. The inner A pillar preferably is supported inwardly against the bulkhead cross member.

The front bulkhead may be inclined so that, in the event of a front-on crash, the front wheel slides out along the front bulkhead. The slide-off surface, therefore, advantageously arises from a combination of the A pillar and the front bulkhead. In the specific crash situation mentioned above, the front wheel slides out away from the center of the vehicle, initially along the front bulkhead and subsequently along the A pillar.

The front bulkhead and a front face surface of the A pillar preferably jointly form a slide-off surface for the front wheel. For this purpose, the front bulkhead and the front face surface of the A pillar may be inclined at a similar angle of inclination.

The front bulkhead may have a greater angle of inclination than the front face surface of the A pillar. The oblique face surface of the sill may cause the wheel rim to split so that the wheel can slide off in an outward direction.

The invention also relates to a motor vehicle having the motor vehicle support structure described above. The motor vehicle support structure may be arranged symmetrically on both sides with respect to a vehicle longitudinal axis.

Further advantages and details of the invention will emerge from the following description of exemplary embodiments.

DETAILED DESCRIPTION OF THE PREFERRED EMBODIMENTS

Figure 1:
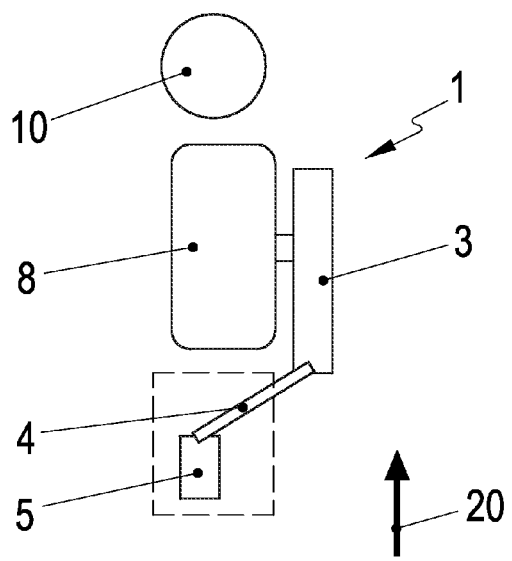
FIG. 1 is a simplified illustration of a motor vehicle support structure with a bollard in front of the front wheel to illustrate a specific crash load situation.

FIG. 1 illustrates, in simplified form, a motor vehicle support structure 1 having a longitudinal member structure 3, a bulkhead 4 and an A pillar 5. A front wheel 8 is mounted rotatably on the longitudinal member structure 3. A bollard 10 is indicated in front of the front wheel 8 to illustrate a specific crash load situation.

The specific crash load situation relates to a crash test referred to as the small-overlap crash test. The small-overlap crash test depicted in FIG. 1 has a motor vehicle impact a round rigid barrier or bollard 10 with an overlap of between 20% to 30%. Deformation occurs in this crash load situation, and, if the motor vehicle is regarded as a fixed point, the load is transmitted via the bollard 10 indirectly onto a sill longitudinal structure via the front wheel 8.

The longitudinal structure 3 of the front wheel 8 is not subjected to major loads in this crash load situation. If the front wheel 8 does not slide off in this crash situation and instead becomes wedged with the A pillar 5, a major part of the forces are transmitted from the front wheel 8 to a passenger cell. To design a passenger cell with the smallest possible dimensions, it is desirable for the front wheel 8 to slide off along the A pillar 5.

Figure 2:
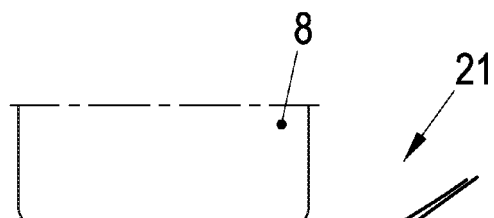
FIG. 2 shows a similar motor vehicle structure to that in FIG. 1, with an additional filler element.

The direction of travel of a motor vehicle having a motor vehicle support structure 21 is indicated by an arrow 20 in FIG. 2. A wheel arch surface 22 faces toward the front wheel 8. The motor vehicle support structure 21 comprises an A pillar 5 assembled from two profile elements 24, 25.

The two profile elements 24, 25 are connected fixedly to one another in a front flange region 26 and in a rear flange region 27. A connection point 28 for connecting a bulkhead 4 to the A pillar 5 is provided on the front right part of the profile element 25 in FIG. 2. The sliding-off motion of the vehicle wheel 8 along the A pillar 5 may be improved by a filler element 29 which, in FIG. 2, is behind the wheel arch surface 22 and forward of the profile element 25 and the bulkhead 4.

Figure 3:
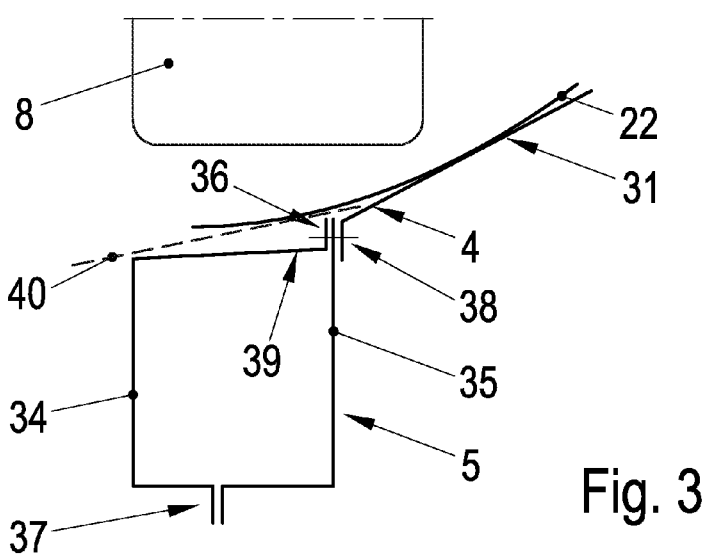
FIG. 3 is a simplified illustration of a motor vehicle support structure according to the invention.

FIG. 3 illustrates, in simplified form, a motor vehicle support structure 31 according to the invention with a bulkhead 4, an A pillar 5 and a front wheel 8. The A pillar 5 is formed from two profile elements 34, 35 that are connected fixedly to one another in a front flange region 36 and in a rear flange region 37. The rear flange region 37 is designed and arranged in exactly the same way as the rear flange region 27 FIG. 2.

The front flange region 36 of FIG. 3 is located more toward the center of the vehicle than the front flange region 26 of FIG. 2. Thus, the front flange region 36 is arranged on the front inner side of the A pillar 5, which the right side in FIG. 3. Additionally, the bulkhead 4 is fastened directly to the front flange region 36 at a connection point 38 so that a geometric slide-off plane advantageously is achieved by existing components.

A front limb 39 of the profile elements 34 of FIG. 3 is inclined slightly and preferably at an angle of approximately 5° to a vehicle transverse axis. The bulkhead 4 is inclined at a greater angle, and preferably at an angle of approximately 30° to the vehicle transverse axis.

A dashed line 40 indicates a slide-off surface along that the front wheel 8 slides off in the specific crash load situation described above. Relocation and displacement of the front flange region 36 of the A pillar 5 inward and toward the center of the vehicle creates a natural slide-off surface 40 in a simple manner. The slide-off surface 40 advantageously is achieved with no additional components. Furthermore, the slide-off surface 40 is realized without reducing the cross section of the A pillar 40.

The motor vehicle structure 31 illustrated in FIG. 3 also achieves the slide-off surface 40 by having the two profile elements 34, 35 exhibit different strengths. More particularly the slide-off surface 40 is achieved by having the inner profile element 35 exhibit a higher strength than the outer profile element 34.

The different strengths may be achieved by forming the inner profile element 35 with a greater wall thickness than the outer profile element 34. Alternatively or in addition, the inner profile element 35 may be formed from a material of higher strength than the outer profile element 34. Alternatively or in addition, the outer profile element 34 may be formed from a material with a greater elongation at fracture than the inner profile element 35.

Figure 4:
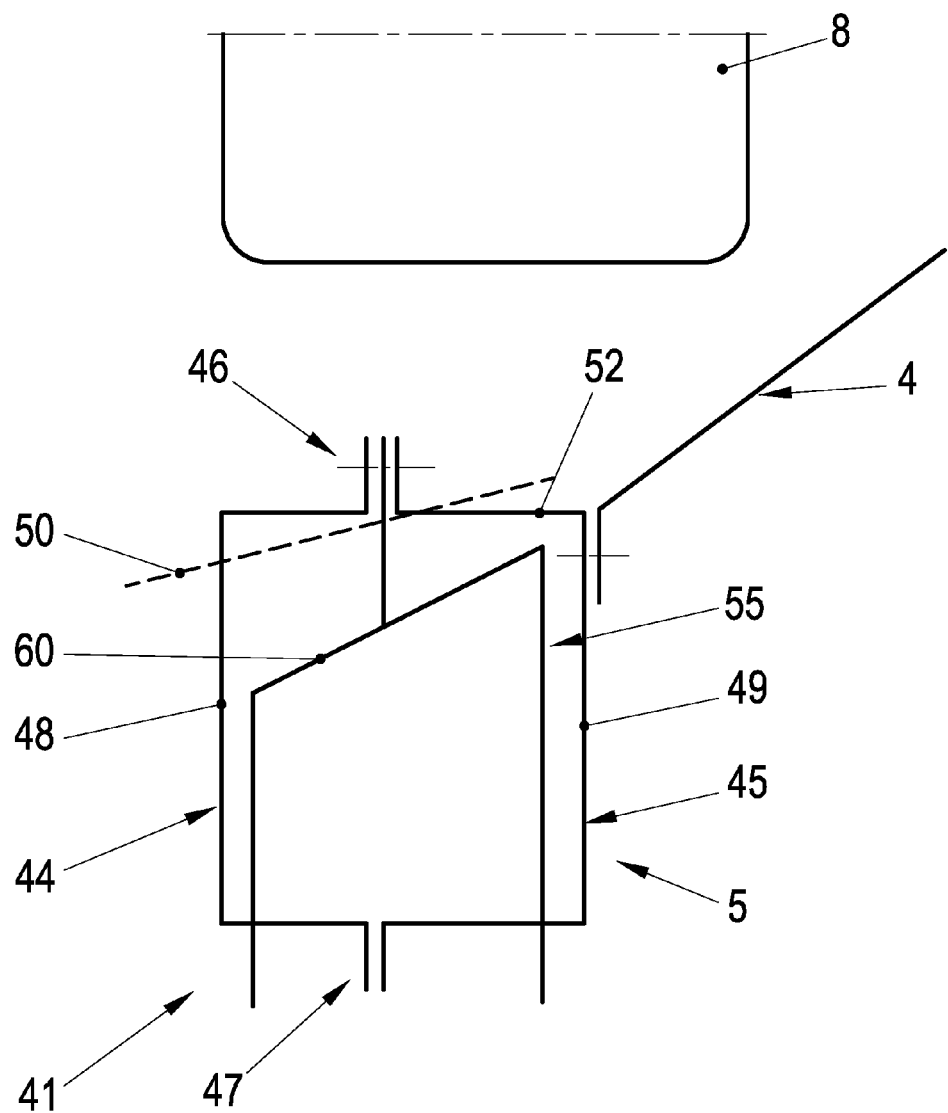
FIG. 4 is a similar illustration to that in FIG. 3, showing a further exemplary embodiment of the invention.

FIG. 4 illustrates a motor vehicle support structure 41 according to the invention with a bulkhead 4, an A pillar 5 and the front wheel 8. The A pillar 5 is formed from two profile elements 44, 45 that are connected fixedly to one another in a front flange region 46 and in a rear flange region 47. The flange regions 46 and 47 are arranged in exactly the same way as in the motor vehicle support structure 21 illustrated in FIG. 2.

The left profile element 44 in FIG. 4 is arranged on the outside with respect to a motor vehicle equipped with the motor vehicle support structure 41 and constitutes an outer region 48 of the A pillar 5. Analogously, the profile element 45 arranged on the right in FIG. 4 is arranged at the inside and constitutes an inner region 49 of the A pillar 5.

The A pillar 5 of the motor vehicle structure 41 in FIG. 4 has a higher strength in the inner region 49 than in the outer region 48. The higher strength in the inner region 49 may be realized by an increased wall thickness and/or a material of higher strength. Due to the lower strength in the outer region 48 of the A pillar 5, it is possible for a slide-off surface for the front wheel 8, as indicated by a dashed line 50, to be formed under load, for example in a crash situation, such as a bollard crash situation.

The different strengths makes it is possible, without losses in A pillar cross section, to realize a situation in which the front wheel 8 slides off in an outward direction in the event of an intrusion of the front wheel 8. During a deformation of the A pillar 5, the outer region 48 is deformed more intensely due to the lower strength. As a result, the entire A pillar 5 forms the virtual slide-off plane 50 during the deformation.

According to a further aspect of the invention, in a front inner sub-region 52, the profile element 45 locally has a lower strength or greater elongation at fracture. In this way, it is possible to implement cold-joining techniques. The locally lower or higher strength may be realized by tailored tempering or a tailor-welded blank.

According to a further aspect of the invention, a longitudinal structure 55 may be configured, in a sill region at its front end, to constitute an alternative or additional slide-off surface 60 for the front wheel 8. The longitudinal structure 55 may, as indicated in FIG. 4, be connected to the A pillar 5 in the front flange region 46.

What is claimed is:

1. A motor vehicle structure comprising: an A pillar, a sill, a front wheel and a slide-off surface for the front wheel, the slide-off surface being defined by forming an inner region of the A pillar to have a greater wall thickness than an outer region of the A-pillar so that the inner region of the A-pillar exhibits higher strength than the outer region of the A pillar.

2. A motor vehicle structure comprising: an A pillar, a sill, a front wheel and a slide-off surface for the front wheel, wherein the A pillar has an inner region and an outer region, the slide-off surface being defined by forming the inner region of the A pillar from a material of higher strength than a material in the outer region.

3. The motor vehicle structure of claim 2, wherein the inner region of the A pillar is formed in from a material with a strength greater than 1200 MPa.

4. The motor vehicle structure of claim 2, wherein the outer region of the A pillar is formed in from a material with a strength less than 1200 MPa.

5. The motor vehicle structure of claim 2, wherein a front inner sub-region of the A pillar has locally modified material characteristics.

6. The motor vehicle structure of claim 2, further comprising a longitudinal structure with a slide-off surface in a sill region at a front end.

7. The motor vehicle structure of claim 2, wherein the sill is an aluminum extruded profile or is reinforced with an aluminum extruded profile.

8. The motor vehicle structure of claim 2, wherein a front A pillar flange is arranged toward a centre of the vehicle.

9. A motor vehicle having the motor vehicle structure of claim 2.

10. A motor vehicle structure comprising: an A pillar, a sill, a front wheel and a slide-off surface for the front wheel, wherein the A pillar has an inner region and an outer region, the slide-off surface being defined by forming the outer region of the A pillar from a material with a greater elongation at fracture than a material in the inner region.

11. A vehicle structure of comprising: an A pillar, a sill, a front wheel and a slide-off surface for the front wheel, the slide-off surface being defined by forming in an inner region the A pillar to exhibit higher strength than in an outer region of the A pillar, the motor vehicle structure further comprising a longitudinal structure with a slide-off surface in a sill region at a front end, wherein the longitudinal structure in the sill region at a front end is cut obliquely in a sub-region so that a length of the longitudinal structure is smaller in the outer region of the sill than in the central or inner region of the sill.

* * * * *